2,915,157

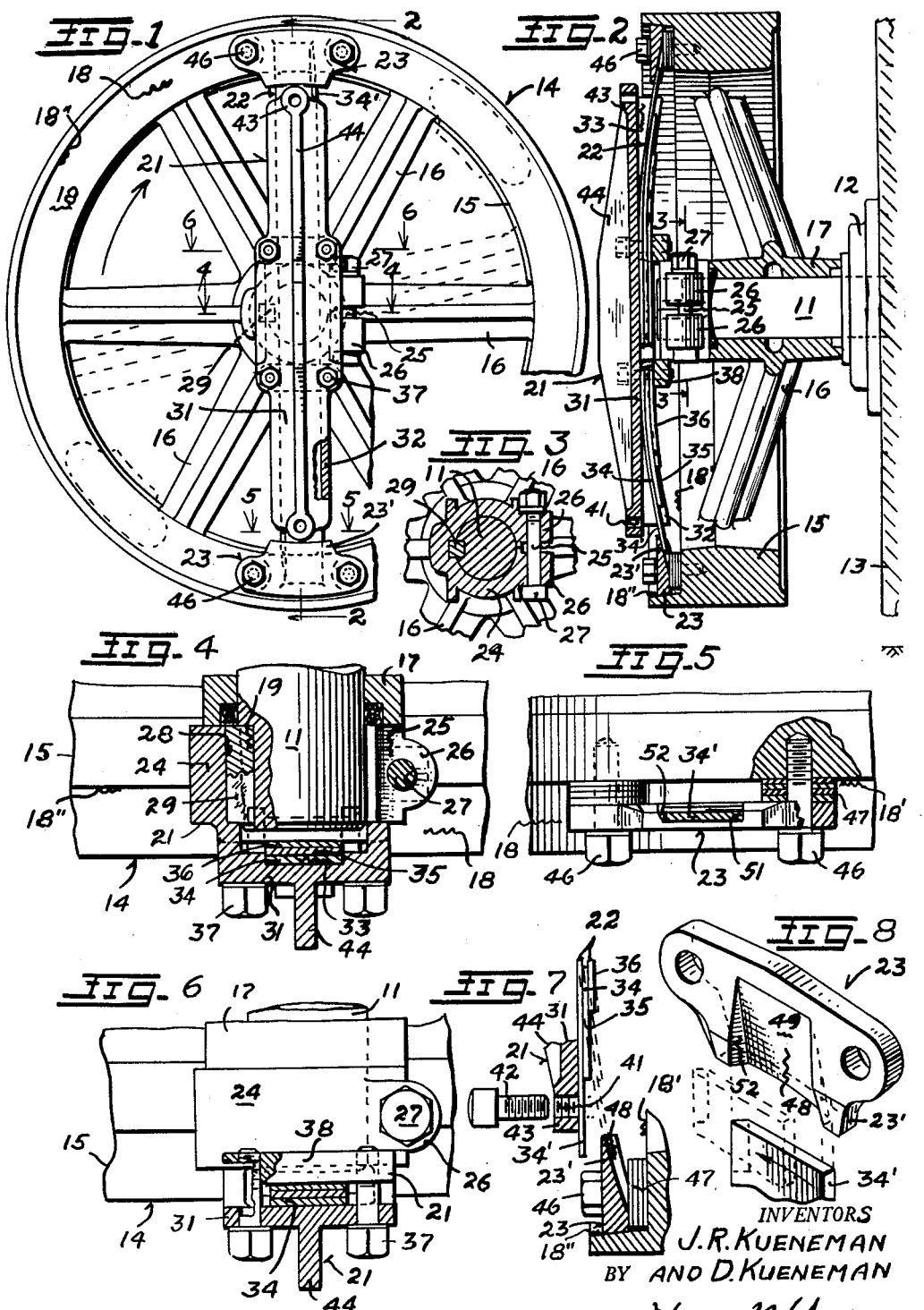

OVERLOAD RELEASE DEVICE

John R. Kueneman and Don Kueneman, Oakland, Calif.

Application May 21, 1956, Serial No. 586,265

10 Claims. (Cl. 192—56)

The invention relates to an overload release device which is particularly designed for connecting coaxial rotary elements which normally rotate together for power-transmitting purposes in various machine combinations.

The present overload release device is particularly arranged for use in releasably connecting a shaft with such rotary elements as pulley wheels or gear wheels or sprocket wheels or disc wheels arranged to drive or be driven by the shaft when suitably connected thereto for rotation therewith.

A general object is to provide a shaft and wheel connection having a particularly dependable and rugged overload release device for use with heavy-duty machines.

Another object is to provide an overload release connection which functions with a particularly high mechanical advantage.

A further object of the invention is to provide a connection of the character described in which the torque required to release the shaft and wheel connection is adjustable.

An added object is to provide an overload release device of the character described in which a broken drive connection may be reestablished only by positive operations performed by a means which is actuatable only while the wheel and shaft are static.

Yet another object is to provide an overload release connection of the character described in which the connection does not subject the connected wheel and shaft to unbalanced stresses, whereby to constantly maintain a dynamically balanced rotary assembly with respect to the shaft axis.

The invention possesses other objects and features of advantage, some of which, with the foregoing, will be set forth or be apparent in the following description thereof, and in the accompanying drawings, in which Figure 1 is a side elevation showing the present overload release device providing a connection between a shaft and a wheel mounted thereon.

Figure 2 is an axial sectional view taken at the line 2—2 in Figure 1.

Figure 3 is a fragmentary section taken at the line 3—3 in Figure 2.

Figure 4 is an enlarged fragmentary section taken at the line 4—4 in Figure 1.

Figure 5 is an enlarged fragmentary section taken at the line 5—5 in Figure 1.

Figure 6 is a fragmentary section taken at the line 6—6 in Figure 1.

Figure 7 is an enlarged showing of the lower portion of the sectional view of Figure 2, but showing a mutually disengaged relation of normally engaged elements of the present wheel and shaft connection thereat.

Figure 8 is an enlarged fragmentary perspective showing of the connection elements as in disengaged relation.

In its present embodiment, the device of our invention is shown as cooperatively associated with a shaft 11 which extends from a bearing 12 provided through an upright support plate 13 comprising a side member of a frame supporting a mechanism (not shown) designed to be driven by or to drive the shaft. The shaft 11 mounts a balanced wheel 14 having a relatively wide and thick rim 15 carried by spokes 16 extending from a hub 17 which rotatively receives the shaft 11 except while the wheel is connected to the shaft by the described overload release connection of our invention. The present wheel 14 comprises a pulley wheel which may also function as a flywheel by reason of having its annular rim 15 relatively heavy, and said wheel rim is of uniform width and is uniformly countersunk from its outer side and inwardly of its periphery to provide a uniform circumferential recess 18 which is bounded by a planar radial face 18' and by a cylindrical circumferential face 18". The wheel hub 17, it is noted, has its inner end offset inwardly from the inner side of the wheel to provide an appropriate clearance between the wheel and the upright frame side 13, and the outer hub end lies substantially in the central plane of the wheel rim 15 while the shaft 11 extends outwardly of said plane for mounting a shaft-carried element of the present connection device, with the shaft portion beyond the wheel hub 17 provided with an exterior axial keyway slot 19.

It will now be noted that a member 21 is mounted on and across the extending end of the shaft 11, and carries an elongated leaf-spring assembly 22 arranged for the inwardly sprung disposal of its extremities against opposed inner faces of retaining blocks or keepers 23 which are mounted on the wheel 14 in its recess 18 at diametrically opposite points thereof, whereby to frictionally connect the shaft to the wheel. The member 21 comprises an elongated rigid bar which is provided centrally thereof with a transverse and integral socket extension 24 by which it may be mounted on the shaft portion extending outwardly of the wheel hub 17. At one side thereof, the socket 24 is provided with an axial slot 25 extending radially outwardly from the socket bore between opposed ears 26 which are connected by a clamp bolt 27 to provide for clampedly mounting the socket and bar on the received shaft end while retaining the wheel hub 17 between the inner socket end and the bearing 12 at the wall 13. Opposite the slot 25, the bore of the socket 24 is provided with an axial keyway 28 for registration with the keyway 19 of the shaft whereby a key 29 is simultaneously engageable in said keyways to positively secure the bar 21 for its rotation with the shaft 11, it being understood that the clamped mounting of the socket 24 on and about the outer shaft and serves the same purpose of fixing the shaft and bar together, but to a lesser degree which may be sufficient in some installations of the connection.

By particular reference to Figures 1, 2 and 4 of the drawings, it will be seen that the bar 21 has an elongated flat plate portion 31 for disposal in perpendicular relation to the shaft axis and is provided with mutually parallel side flanges 32 defining a channel 33 along the length of the portion. Intermediately thereof, the flanges 32 integrally connect the outer end of the wall of the socket portion 24 to the bar portion 31 in spanning relation to the channel 33, it being noted that the axial slot 25 of the socket wall extends in a plane perpendicular to the longitudinal line of the portion. The present spring assembly 22 comprises an assembly of leaf springs of progressively different lengths, with a longer spring leaf 34 disposed along and opposite the bottom of the channel 33 and having corresponding end portions 34' extending somewhat beyond the ends of the member 21 for their engagement behind the keepers 23. Additional spring leaves are preferably provided at the inner side of the leaf 34 for progressively stiffening the spring assembly toward its center; as particularly shown, an intermediate leaf 35 slightly shorter than the portion 31 engages flat along and against the inner side of the leaf 34, while a still shorter leaf 36 is engaged along and against the inner side of the intermediate leaf 35, the spring leaf arrangement being symmetrical with respect to the shaft axis. When unflexed, the larger leaf 34 is preferably engaged with and along the bottom of the channel 33 for its entire length.

The spring leaves 34 and 35 and 36 are clampedly fixed to the member 21 by cap bolts 37 extending through the plate 31 and threadedly engaged in clamp bars 38 disposed across the inner leaf 36, the arrangement being essentially such that the ends of the leaf assembly may be flexed away from the bottom of the channel 33 in the relation indicated in Figure 2, and means are provided for effecting such a deflection of the spring assembly ends when and as required. Accordingly, the bar 21 is provided with threaded openings 41 transverse to the plane of the portion 31, and thrust screws 42 are provided for mounting in the threaded holes 41 from the outer ends thereof to present their inner ends against the ends of the spring leaf 34 for arching the spring assembly out of its flat engagement in the bottom of the channel 33 which it tends to assume, reference being made to the showings of Figures 2 and 7 as to this feature. Preferably, and as shown in Figure 2, the flanges 32 of the bar portion 31 are of increasing width radially of the clampedly held intermediate portions of the spring assembly whereby they may serve as lateral guideways for the deflected spring ends. Also, as is particularly shown in Figures 1, 2 and 7, the threaded screw-receiving openings 41 of the bar ends are provided in outwardly extending cylindrical bosses 43 which are connected by a generally triangular web 44 for transversely stiffening the bar against its undue flexing when the screws 42 are applied to the spring ends for deflecting the springs away from the bar ends.

It will now be noted that a retaining block or keeper 23 comprises an elongated element arranged for its mounting at and along the outer side of the wheel rim 14 in the recess 18 by means of a pair of cap screws 46 disposed through opposite ends of the element and threadedly engaging the rim axially thereof at the recess face 18". For reasons to be hereinafter brought out, spacing shims or washers 47 are installed between the keeper 23 and the rim face 18' to provide for an axially spaced adjustment of an installed keeper with respect to the rim. A mounted keeper 23 has a portion 23' extending radially inwardly of the radially inner side of the mounting rim, and at least one keeper 23 of the pair is provided with a generally wedge-shaped channel 48 extending radially in its inner face and between its secured ends, said channel having a width approximately that of a spring end 34' and having its bottom face 49 defined between opposed side faces 51 and 52 and arranged for its generally flat engagement by a deflected spring end 34', with the side face 51 perpendicular to the channel bottom face 49 and the face 52 oblique to said channel bottom face.

When a spring end 34' is engaged in the channel 48 of a keeper 23, it preferably extends no further than that inner line of the rim, and is arranged to be retained in said channel unless and until an appropriate relative rotation of the wheel and shaft urged by an overload has sufficient magnitude to disengage the spring end from the channel by wedgedly sliding it over the channel bottom 49 and the sloping channel side 52 for effecting its removal from the channel and its release from the keeper, it being understood that the spring-engaging faces of said channel bottom 49 and side 52 provide a frictional resistance to the releasing movements of the spring ends thereover in accordance with the pressure exerted by the springs ends thereagainst. When the spring ends 34' are freed by an overload from their contacts with the back friction faces of the keepers 23, they move outwardly of the wheel to permit relatively free rotative movements of the wheel and shaft until such a time as said spring ends are reengaged with the friction faces 49 of the keepers; in this manner, an overload of the driven mechanism creates a torque action between the wheel and shaft to automatically free them for their subsequent relative rotatability until a deliberate resetting of the springs ends 34' in cooperative relation to the keepers 23 is effected.

For resetting the present overload connection, thrust screws 42 installed in the threaded openings 41 of the bosses 43 of the bar 21 are applied against the opposed spring ends until the spring ends may rotate in a plane inwardly of the plane of movement of the keepers 23, the spring ends are then disposed opposite the keeper by effecting an appropriate relative rotation of the shaft and wheel, and the screws 42 are then withdrawn to permit the set engagement of the spring ends with the keepers for connecting the wheel and shaft for their rotation together. With the present arrangement, it will be understood that the overload connection may be reset only while the wheel and shaft are idle with respect to the work to be done, this being a preferred condition for safety reasons. It will also be understood that the present overload connection may be mechanically released by applying the screws 42 against the spring ends 34' to free the wheel and spring connection, whereby the subsequent withdrawal of the screws while the spring ends are out of registration with the keepers will free the wheel and shaft for their relative rotation.

Understanding that the effective pressure engagements of the different spring ends 34' with the different keepers 23 must be equal to avoid deleterious bending reaction between the shaft 11 and the bar 21 while the connection is functioning, said pressures are adjustable to equality by the appropriate use of the spacing shims 47 between the wheel rim and the keepers, it being further understood that the variable aggregate thickness of shims usable with the different keepers provides for an adjustment of the effective pressure engagement of the spring ends with the rim, whereby the shims provide a means adjustable to adjust the pressure engagement of the spring ends with the keepers. Furthermore, only one of the keepers need be provided with a channel 48 at its friction face 49, whereby the other keeper need provide only a flat friction face having the relation of a channel bottom face 49 to the keeper which provides it. It is also to be understood that, by reason of the relatively long lever arms provided by the spring portions radiating from the shaft axis to the wheel rim, that the frictional resistance provided by the pressure engagement of the cooperative spring ends 34' and the keepers 23 has a relatively high mechanical advantage whereby particularly accurate adjustments of the overload torque required to release the wheel from the shaft are permitted in accordance with the balanced pressure adjustment permitted at the shims 47. It will also be particularly noted that the present overload release device requires no lubrication in its maintenance, as do most of such devices heretofore known to the applicant.

While, as indicated, the described balanced connection provided by a present leaf spring fixed to a shaft diametrically thereof and having its ends of its radial portions engageable with keepers at diametrically opposite points of a shaft-carried wheel is generally preferable, it will be understood that a satisfactory overload connection might, in some installations, require and utilize only one radial portion of the disclosed spring, or provide a single spring arm extending radially from the axis of the mounting shaft for connection with a keeper on a wheel, without departing from the general principle of the present power-transmitting device in which a leaf spring arm is utilized to provide a releasable overload connection. It will also be understood that a springcarrying bar which is fixed to a shaft and mounts a single radial spring arm and is arranged for the use of a spring-setting screw 42 may also extend in but one direction with respect to the shaft axis.

With reference to the duty to be performed by the disclosed overload connection of our invention, it is to be noted that the same was designed and developed for use with such heavy-duty machines as rock crushers wherein overloads caused by an undue packing of a charge in the crushing zone or the presence of uncrushable metallic or other bodies in the charge may require a prompt and maintained driving release until the condition causing it is alleviated. More specifically, the present overload release device has been designed for use to provide the connection between the drive pulley and the driven jaw-actuating shaft of such machines as the jaw crusher of the U.S. Patent No. 2,721,036, which issued to us on October 18, 1955, with the present overload connection replacing the friction-type overload connection indicated in the structure disclosed in said patent. Also, while the aforesaid patent relates to a structure in which a pulley wheel drives a shaft, it will be understood that the present connection is usable between a drive shaft and a driven wheel, as well as between relatively rotatable power-transmitting elements generally.

From the foregoing description taken in connection with the accompanying drawings, the advantages of the present overload release device will be readily understood by those skilled in the art to which the invention appertains. While we have described the principle of operation, together with arrangements which we now consider to comprise preferred embodiments thereof, we desire to have it understood that the showing is primarily illustrative, and that such changes and developments may be made, when desired, as fall within the scope of the following claims:

We claim:

1. In a fully disengageable overload release drive connection for power-transmitting elements which are arranged for their relatively free rotation in place about a common axis when the drive connection is disengaged, a leaf spring radially related to said common axis of rotation of the elements means at the inner spring end attaching the spring to one said element in radial relation thereto with the outer spring end deflectable axially of said common axis of rotation of the elements and freely movable in a circular path spaced from the other said element when the spring is undeflected, and a keeper member provided by the other said element and disposed for rotation with the latter element in a circular path transversely spaced from the path of the undeflected second spring end and providing an axially directed friction face arranged for the normally maintained frictionally held pressure engagement of the outer end of the said spring therewith for releasably holding the spring operatively flexed axially of the shaft solely during the pressure engagement of the spring end with said friction face of the keeper under normal conditions and for a slipping release of the spring end from the keeper under overload conditions.

2. In a fully disengageable overload release drive connection for power-transmitting elements which are arranged for their relatively free rotation about a common axis when the drive connection is disengaged, a keeper member provided on one said element and having a friction face directed axially of said common axis of rotation of the elements, a leaf spring radially related to said common axis of rotation of the elements and having an inner end thereof fixed to the other said element and having the outer end thereof deflectable axially of said axis of rotation of the elements and providing a friction face directed axially of the common axis and oppositely with respect to said friction face of the keeper member, said spring being movable in a circular path spaced from the keeper member when the spring is undeflected and having its said friction face arranged for its frictionally retained pressure engagement with said friction face of the keeper solely while the spring is flexed axially of the shaft to dispose and hold said friction faces in mutual engagement and providing for a slipping release of the spring from the keeper under overload conditions at the connection.

3. In an overload release connection between a shaft and a wheel having a concentric rim and mounted on the shaft for its free rotation about the shaft when the connection is released, a relatively straight leaf spring having an inner end portion fixed to the shaft for a constant rotation of the spring therewith, said mounted spring extending radially from the shaft to dispose an outer end portion opposite said wheel rim and arranged for its flexed displacement axially of the shaft and toward the wheel rim, and a keeper member fixedly mounted on the wheel rim and providing a friction face arranged for the normal pressure and frictionally held engagement of said keeper face in a direction axial of the shaft by the outer end portion of said spring solely while the spring end portion is frictionally held to the keeper for its release when an overload torque exists between the shaft and wheel, said keeper member being disposed out of the path of movement of the outer end of the unflexed spring when the shaft and wheel are relatively rotating in rotatively free relation whereby a retained reengagement of the outer spring portion with the keeper is arranged to be effected solely while the shaft and wheel are not rotating.

4. In a torque-controlled overload release device for connecting a rotatable shaft with a wheel rotatably mounted in coaxial relation to the shaft and having an annular rim, a drive connection between the shaft and wheel comprising a relatively straight leaf spring disposed radially of the shaft and wheel axis with its plane transverse to said axis, means fixing an inner spring portion to the shaft to dispose the outer spring portion opposite the wheel rim for its deflection axially of the shaft and toward the wheel rim, and a keeper member provided on the wheel rim and having a friction face which is arranged for the frictionally retained pressure engagement therewith of the deflected spring portion under normal power-transmitting torque conditions between the shaft and wheel and for a slipping release of the spring from engagement with the keeper member under excessive torque conditions between the shaft and wheel.

5. The structure of claim 4 having a rigid bar fixedly mounted on the shaft in the same radial relation thereto as the spring, and means on the bar reactive with the outer portion of the released spring to adjustably position the outer spring portion for its positioning in its retained pressure engagement by the keeper member.

6. The structure of claim 4 wherein the said fritcion face of said keeper member comprises the bottom of a trough extending radially of the wheel and having a sloping side arranged for the movement of the normally engaged spring portion thereover during an overload release of the spring portion from the trough.

7. The structure of claim 4 wherein the spring comprises one of a plurality of like spring arms extending symmetrically from the shaft and wheel axis, and the wheel rim provides a like number of the keeper members arranged for their simultaneous engagement by the outer end portions of the spring arms.

8. The structure of claim 4 wherein the keeper member is adjustably mounted on the rim by means adjustable to adjust said member axially of the wheel to provide an adjusted pressure engagement of the deflected spring portion against the friction face of the keeper member.

9. In an overload release device connecting a shaft with a wheel rotatably mounted on the shaft and having an annular rim, a driving connection between said elements comprising an elongated leaf spring intermediately fixed to the shaft to provide like spring arms for rotation with the shaft end extending radially and oppositely outwardly from the shaft axis substantially to said said wheel rim, keeper members mounted on the wheel rim and providing friction faces arranged for the simultaneous and like pressure engagement of said faces by the outer ends of said spring arms in a direction axial of the shaft and wheel while the spring arms are held flexed by the keepers axially of the shaft and toward the central plane of the wheel under normal power-transmitting torque conditions between the shaft and wheel and for a slipping release of the arm ends from engagement with the keeper members under excessive torque conditions between the shaft and wheel.

10. The structure of claim 9 having a rigid bar member fixed intermediately thereof to the shaft for rotation with the shaft and spring and having portions extending radially of the shaft beside the spring arms axially thereof and substantially to the wheel rim, and means on the bar portions reactive with the opposed spring ends for releasably flexing the spring ends away from the bar for the disposel of the spring ends opposite the keeper members for their subsequent seating against the keeper members when the flexing means is released.

References Cited in the file of this patent
UNITED STATES PATENTS
1,194,713   Churchward _____ Aug. 15, 1916